United States Patent
Sands, III (10) Patent No.: US 6,785,788 B1
(45) Date of Patent: Aug. 31, 2004

(54) SYSTEM AND METHOD FOR IMPLEMENTING AN ENHANCED RAID DISK STORAGE SYSTEM

(75) Inventor: William H. Sands, III, Pennsburg, PA (US)

(73) Assignee: Unisys Corporation, Blue Bell, PA (US)

( * ) Notice: Subject to any disclaimer, the term of this patent is extended or adjusted under 35 U.S.C. 154(b) by 264 days.

(21) Appl. No.: 09/898,260

(22) Filed: Jul. 3, 2001

(51) Int. Cl.$^7$ .............................................. G06F 12/00
(52) U.S. Cl. ........................ 711/162; 711/114; 711/156
(58) Field of Search ................................ 711/114, 156, 711/162

(56) References Cited

U.S. PATENT DOCUMENTS

| | | | | |
|---|---|---|---|---|
| 5,537,534 A | * | 7/1996 | Voigt et al. ..................... | 714/6 |
| 5,615,352 A | * | 3/1997 | Jacobson et al. ............ | 711/114 |
| 6,115,788 A | * | 9/2000 | Thowe ....................... | 711/111 |
| 6,170,037 B1 | * | 1/2001 | Blumenau ..................... | 360/15 |
| 6,327,638 B1 | * | 12/2001 | Kirby ............................ | 711/4 |
| 6,530,004 B1 | * | 3/2003 | King et al. .................. | 711/165 |
| 2002/0046360 A1 | * | 4/2002 | Watkins et al. ................ | 714/6 |
| 2002/0069317 A1 | * | 6/2002 | Chow et al. ................ | 711/104 |
| 2002/0124139 A1 | * | 9/2002 | Baek et al. .................. | 711/114 |

OTHER PUBLICATIONS

Molina, Joe, "The RAB Guide to Non–Stop Data Access", www.raid–advisory.com/rabguide.html, Apr. 27, 2001, 15 pages.

Santos, Jose Renato, et al., "Comparing Random Data Allocation and Data Striping in Multimedia Servers", 1999, pp. 1–12.

Techencyclopedia, RAID, www.techweb.com/encyclopedia/printDefinition?term=RAID, Apr. 25, 2001, 8 pages.

AC&NC, RAID.edu, www.acnc.com/04/01/00.html, Jun. 26, 2001, 19 pages.

* cited by examiner

*Primary Examiner*—Reba I. Elmore
(74) *Attorney, Agent, or Firm*—Lisa A. Rode; Nathan Cass; Woodcock Washburn (57) ABSTRACT

Improved systems and methods for storing data, wherein data stored on one or more disks of a first capacity is mirrored to one or more disks of a second, larger capacity. According to the invention, one or more disk drives of a first capacity may be coupled to create a virtual volume. One or more disks of a second, larger capacity are then used to provide a single larger volume or multiple larger volumes that serve as the mirroring drive or drives for the array of smaller drives. Data from the smaller drives is stacked in stripes sequentially across the larger drive(s). Alternately, data from the smaller drives may be striped in zones across the larger drive(s). In yet another embodiment, the asymmetric nature of the mirroring technique of the present invention can be used in reverse, wherein an array of smaller capacity drives serve as the mirror for one or more larger capacity drives.

14 Claims, 8 Drawing Sheets

SYSTEM AND METHOD FOR IMPLEMENTING AN ENHANCED RAID DISK STORAGE SYSTEM

FIELD OF THE INVENTION

The invention relates generally to the field of storing data on computer storage devices such as disks. More particularly, the invention provides a technique for storing direct images of data on asymmetrically-sized disks by mirroring data contained on a disk or disks of one capacity on a disk or disks of another size.

BACKGROUND OF THE INVENTION

Data stored on storage media such as disks must be protected from adverse events including human errors, equipment failures and adverse environmental conditions. Additionally, the ability of a disk system to maintain immediate on-line access to data contained on the disk despite a failure has become important with the proliferation of on-line, interactive computing.

One of the methods of storing data developed to address these needs is RAID—Redundant Arrays of Independent Disk drives. Typically, RAID employs a number of homogeneous drives to derive lost or corrupted data from other members of a set. Various schema describing how data and redundant data are mapped across the multiple disks of an array to provide data availability and protection are classified as RAID Levels 1–6.

RAID can provide redundancy in the form of mirroring (RAID 1) or in the form of parity (RAID 3, 4, 5 and 6). Mirroring of data in a RAID 1 implementation involves writing an exact image of the data on a second disk. Typically, implementations of RAID 3, 4, 5, or 6 involve the use of at least 3 disks of identical capacity, where at least two disks are used for writing data and one disk is used to store parity data. In other words, parity data resides on a disk other than the two or more disks containing the data from which the parity was generated. With parity-based RAID implementations, redundancy of data (overhead) can be reduced from 100 percent (the case for mirroring) to between 10 and 33 percent. Parity-based RAID implementations may suffer from poor performance, even during normal (non-failure) conditions because of the need to generate and write parity during a write operation. During abnormal conditions, poor performance is exacerbated by the need to regenerate or recalculate data using parity data. Performance in mirrored systems is typically better than in parity systems because data does not need to be regenerated; it just needs to be read from a different disk. The disadvantage of mirroring is that for each disk mirrored, a second identical disk, must be purchased.

In view of the foregoing, there is a need for a storage system that overcomes the drawbacks of the prior art.

SUMMARY OF THE INVENTION

The present invention is directed to improved systems and methods for storing data, wherein data stored on one or more disks of a first capacity is mirrored to one or more disks of a second, different capacity. The invention effectively provides a new level of RAID.

According to the invention, one or more disk drives of a first capacity may be coupled to create a virtual volume. In one embodiment, one or more disks of a second, larger capacity are then used to provide a single larger volume or multiple larger volumes that serve as the mirroring drive or drives for the array of smaller drives. Data from the smaller drives is stacked in stripes sequentially across the larger drive(s). Alternately, data from the smaller drives may be striped in zones across the larger drive(s). In another embodiment, the asymmetric nature of the mirroring technique of the present invention can be used in reverse, wherein an array of smaller capacity drives serve as the mirror for one or more larger capacity drives.

Because no parity calculations are required, the present invention increases performance both in normal and in fault conditions. In the case of a failure of a single drive, access to any of the remaining data drives is not required for data recovery, hence improving performance and reducing required resources for recovery. Also, the time to rebuild a failed data disk is reduced, minimizing the period of time in which the system is running under fault conditions. Multiple failures of the data drives do not impact the mirroring drive(s). Restoration of data to a failed drive is a direct image of the data and therefore does not require reconstitution of the required data from the remaining data drives. If a third party or active drive capabilities exist, data can be restored without consuming host processor resources and bandwidth. Overhead is reduced from 100% for normal mirroring systems to some fraction of the total number of data drives, if the mirroring drive(s) is(are) the larger-size drive(s). Alternatively, making the larger drive(s) the data drive(s) and the smaller drives the mirroring drives facilitates the breaking off of a portion of the database to give to a user. The drives do not have to be initialized in order to maintain data coherency. The present invention supports multiple simultaneous read/write operations.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

RAID devices typically are defined in a homogeneous drive environment, that is, all the disk drives in the RAID system have identical capacity.

Figure 2A:
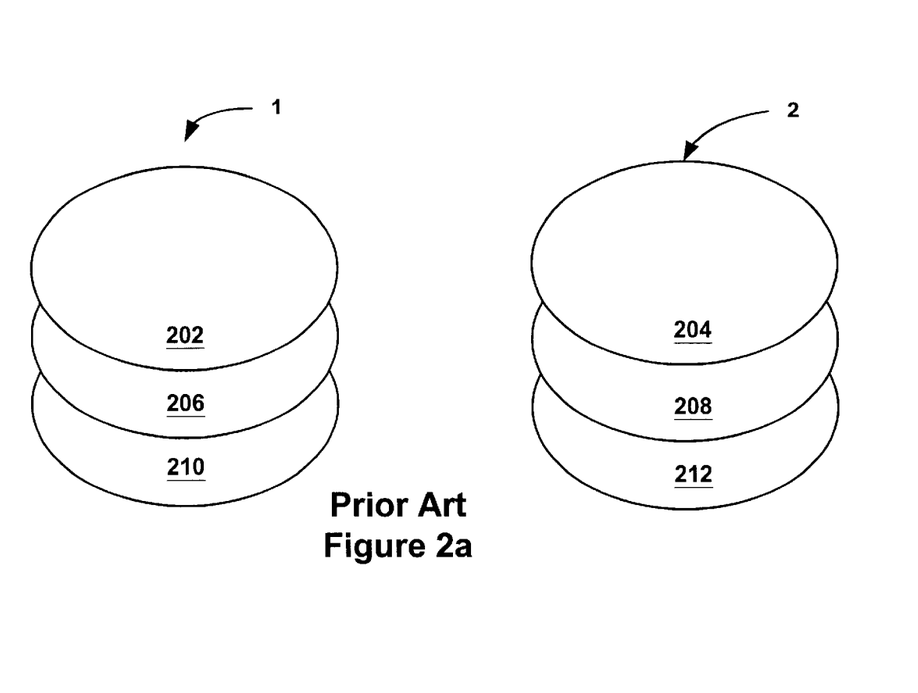
FIG. 2a is a block diagram of a RAID Level 0 system as is well-known in the art.

RAID Level 0, represented in FIG. 2a, is disk striping only, in which data is interwoven across multiple disks for better performance. RAID Level 0 does not provide safeguards against failure. Referring now to FIG. 2a, drive 1 is composed of a plurality of platters, here arbitrarily represented as three in number, 202, 206 and 210. Drive 2 is composed of platters 204, 208 and 212. Assume that a database consists of six datasets, datasets A through F. In a RAID Level 0 implementation, dataset A would be written to platter 202 of drive 1, and dataset B would be written to platter 204 of drive 2. Dataset C would be written to drive 1 platter 206, dataset D to drive 2, platter 208, dataset E to drive 1, platter 210, and dataset F to drive 2, platter 212. Hence, data is not written sequentially on drive 1 or on drive 2, which tends to increase performance. However, if drive 1 fails, datasets A, C and E cannot be recovered. If drive 2 fails, datasets B, D and F cannot be recovered. Furthermore, the database will be inaccessible until data is recovered from standard back-up storage media.

Figure 2B:
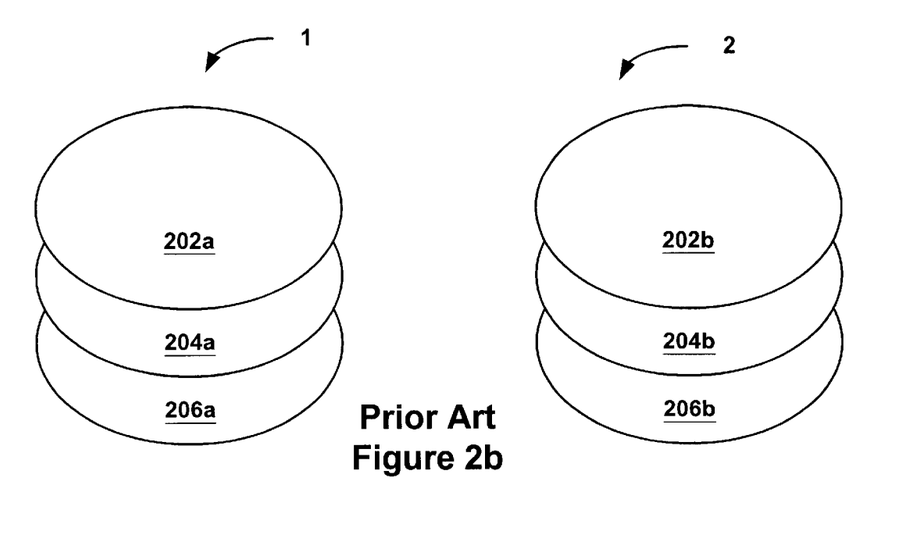
FIG. 2b is a block diagram of a RAID Level 1 system as is well-known in the art.

FIG. 2b represents the structure of a RAID Level 1 implementation. RAID Level 1 uses disk mirroring, which provides 100% duplication of data. RAID Level 1 offers the highest reliability, but doubles storage cost because for each drive being mirrored, a mirroring drive must be purchased. Thus data and mirror disks exist in a 1 to 1 ratio. Referring now to FIG. 2b, dataset A, is written to both platter 202a on drive 1 and to platter 202b on drive 2. Similarly, dataset B is written to both platter 204a on drive 1 and to platter 204b on drive 2, etc. Dataset C is written to both platter 206a on drive 1 and to platter 206b on drive 2. In the event of failure of drive 1, data can be read from drive 2 and vice versa. No degradation of performance of the system is likely because the only thing that changed is that the data is being read from one drive instead of another one.

RAID Level 2 copies data in bits rather than in bytes or groups of bytes. The bits are interwoven across multiple disks.

Figure 2C:
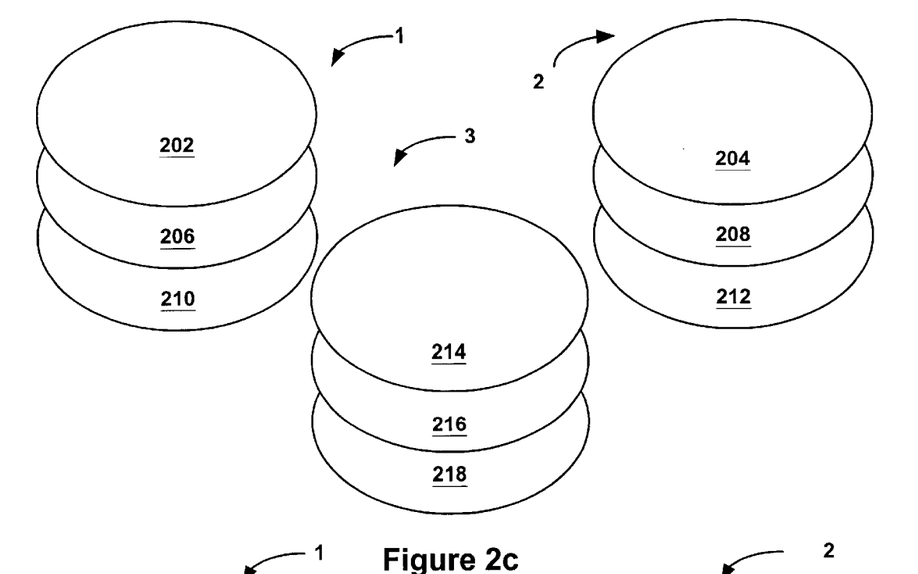
FIG. 2c is a block diagram of a RAID Level 3 system as is well-known in the art.

In RAID Level 3, represented by FIG. 2c, data is striped across three or more drives. RAID 3 achieves the highest data transfer rate, because all drives operate in parallel. Parity bits are stored on separate, dedicated drives. For example, and referring to FIG. 2c, dataset A is stored on drive 1 on platter 202, dataset B is stored on drive 2 on platter 204 and parity data for dataset A and dataset B is stored on drive 3 on platter 214. Similarly, dataset C data is stored on drive 1 platter 206, dataset D on drive 2, platter 208 and parity data for datasets C and D is stored on drive 3, platter 216. Dataset E is stored on drive 1, platter 210, dataset F on drive 2, platter 212 and parity data for datasets E and F is stored on drive 3, platter 218.

In the event that, for example, drive 1 fails, datasets A, C and E can be recreated by computing the data from parity drive 3 and data drive 2. Similarly, drive 2 data can be reconstructed from parity drive 3 and data drive 1. Additionally, performance will degrade, as further described below, because instead of reading data from a drive, the data must be computed using the parity data and the remaining good data drive. If both drives 1 and 2 fail, data cannot be recovered.

RAID Level 4 is similar to RAID Level 3, but manages disks independently rather than in unison.

Figure 2D:
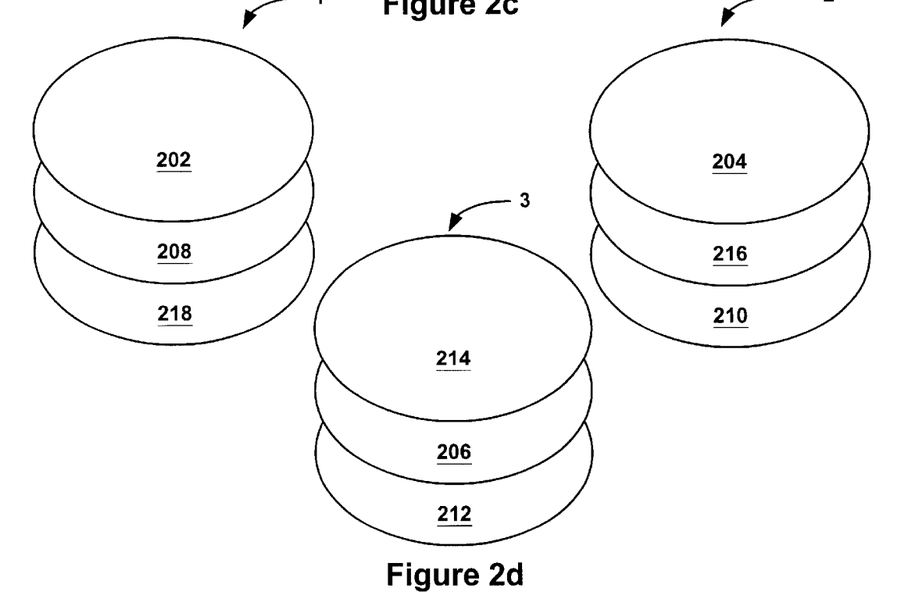
FIG. 2d is a block diagram of a RAID Level 5 system as is well-known in the art.

RAID Level 5 is the most widely-used RAID implementation and is represented in FIG. 2d. Data is striped across three or more drives for performance, and parity bits are used for data protection. The parity data from two drives are stored on a third drive. For example, referring to FIG. 2d, dataset A may be stored on drive 1, platter 202, dataset B on drive 2, platter 204, and parity data for dataset A and dataset B may be stored on drive 3, platter 214. Dataset C may be stored on drive 3, platter 206, dataset D on drive 1, platter 208, and parity data for datasets C and D is stored on drive 2, platter 216. Dataset E may be stored on drive 2, platter 210, dataset F on drive 3, platter 212, and parity data for datasets E and F is stored on drive 1, platter 218. Hence, if drive 1 failed, dataset A could be recalculated from data stored on drive 2, platter 204 and parity data stored on drive 3, platter 214. Similarly, if drive 1 failed, dataset D could be recalculated from data stored on drive 3, platter 206 and parity data stored on drive 2, platter 216. If drive 2 failed, dataset B could be recalculated from dataset A on drive 1, platter 202 and parity data retrieved from drive 3, platter 214. Similarly dataset E could be recalculated from drive 3, platter 212 and parity data stored on drive 1, platter 218. If drive 3 failed, dataset C could be recalculated from data stored on drive 1, platter 208 and parity data stored on drive 2, platter 216. Finally, if drive 3 failed, dataset F could be recalculated from data stored on drive 2, platter 210 and parity data stored on drive 1, platter 218.

Additionally, performance is likely to degrade because instead of reading data from a drive, the data must be computed using the parity data and the remaining good data drive. If two of the three drives fail, however, no data can be recovered.

RAID Level 6 has the highest reliability but is not widely used. RAID Level 6 is similar to RAID 5 but does two different parity computations or the same computation on overlapping subsets of the data.

RAID Level 0+1 requires a minimum of 4 drives to implement. RAID 0+1 is implemented as a mirrored array whose segments are RAID 0 arrays, that is, the data is broken down into blocks and each block is written to a separate disk drive. RAID 0+1 has the same fault tolerance as RAID Level 5 and the overhead of RAID 0. The failure of a single drive will cause the whole array to become essentially a RAID Level 0 array. For example, in RAID Level 0+1, dataset A is written to disk 1, platter 1, and mirrored to disk 3, platter 1. Dataset B is written to disk 2, platter 1 and mirrored to disk 4, platter 1. Dataset C is written to disk 1, platter 2 and mirrored to disk 3, platter 2. Dataset D is written to disk 2, platter 2 and mirrored to disk 4, platter 4. All drives must move in parallel to the proper track, lowering sustained performance.

RAID Level 10 is a combination of RAID 1 and 0 (mirroring). RAID Level 10 requires a minimum of 4 drives to implement and is implemented as a striped array whose segments are RAID 1 arrays (In RAID Level 10, dataset A is written to drive 1, platter 1, drive 2, platter 2 and to drive 3, platter 1. Dataset B is written to drive 1 platter 2, drive 2, platter 2 and to drive 4, platter 1. Dataset C is written to drive 1 platter 3, drive 2 platter 3, and drive 3 platter 2. In RAID Level 10, all drives must move in parallel to the proper track, which lowers sustained performance. In addition RAID 10 is very expensive and is accompanied by high overhead.

RAID Level 53 is implemented as a striped (RAID Level 0) array whose segments are RAID Level 3 arrays and requires a minimum of 5 drives to implement. In RAID Level 53 a datablock is subdivided or striped and written on the data disks. Stripe parity is generated on Writes, recorded on the parity disk and checked on Reads. For example, a dataset A may be broken into blocks A0, and A1. Dataset A block A0 may be written to a drive 1, platter 1, block A1 to drive 2, platter 1, parity for blocks A0+A1 to drive 3, platter 1 and dataset A to drive 4 platter 1. Dataset B may be broken into blocks B0 and B1. Dataset B block B0 may be written to drive 1, platter 2, block B1 to drive 2 platter 2, parity for blocks B0 and B1 to drive 3, platter 2 and dataset B to drive 5, platter 1 and so on. RAID 53 is very expensive to implement and all disk spindles must be synchronized, limiting the choice of drives that can be used. RAID 53 has the same fault tolerance and the same overhead as RAID 3. High data transfer rates are achieved because of the RAID 3 segments. High I/O rates for small segments are achieved because of the RAID 0 striping, however, poor utilization of formatted capacity results from the byte-striping.

There is considerable overhead associated with the read/write operations of the parity-based RAID implementations described above. For example, assume that disk 1 and disk 2 are data disks and disk 3 is the parity disk, as illustrated in FIG. 2c. If "5" is stored on disk 1, platter 202 and "6" is stored on disk 2, platter 204, "11" (5+6) may be contained in the "parity bit" stored on disk 3, platter 214. If drive 1 fails, the data stored on drive 1 can be recovered by subtracting 6 from 11 to yield 5, the data stored on disk 1, before the disk failure. This process requires significant processing, i.e.:

1. Read parity data from disk 3 (returns "11")
2. Read disk 2 (returns "6")
3. Calculate 11–6 (returns "5")
4. Output "5".

During normal (non-failure operation), the following processing would take place to change the "6" on disk 2 to "9":

1. Read parity data on disk 3 (returns "11")
2. Read data to be changed from disk 2 (returns "6")
3. Calculate 11–6 (returns "5")
4. Calculate 5+9 (returns "14")
5. Writes "14" to parity disk 3
6. Writes "9" on data disk 2, thus requiring 4 I/O operations.

Performance problems are compounded because of the growth in capacity of disk storage. In 1990, a "large" drive contained 270 MB. By 1991–1992 a "large" drive was 1 Gigabyte, by 1995 a "large" drive was 4 Gigabytes, by 1996, 9 Gigabytes, by 1997, 18 Gigabytes, by 1999, 72 Gigabytes and by 2001, 180 Gigabytes. Despite the growth in capacity, typically there is only one read/write head per platter.

Because of performance problems, it has become commonplace to create virtual drives (also called a volume set), consisting of a number of physical drives (each one having its own read/write head) logically concatenated to create a larger logical drive. The operating system sees the volume set as a contiguous group of storage blocks, but the physical data resides on multiple drives, broken up by various methods. Because use of parity RAID is associated with increased processing overhead both during normal and abnormal conditions, mirroring data is frequently preferred, even with the 1 to 1 ratio of needed data to mirroring drives. In order to overcome the limitations of the prior art, the present invention provides an enhanced RAID implementation.

Enhanced Asymmetrical RAID Implementation

Figure 3:
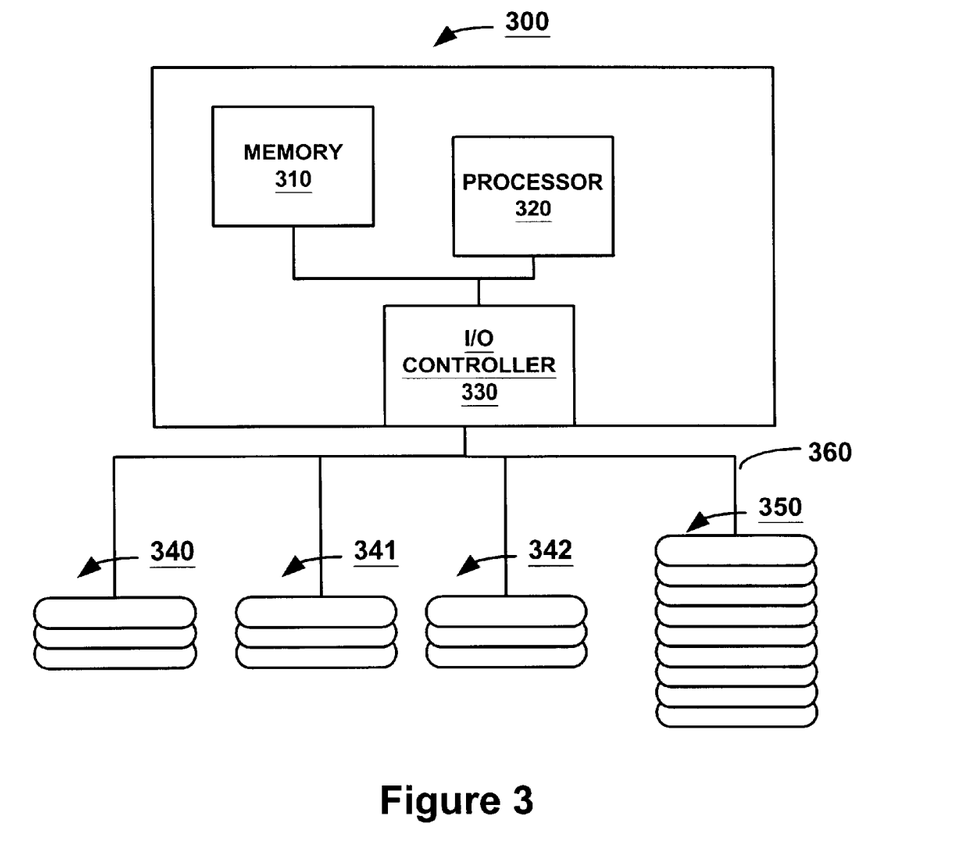
FIG. 3 is a block diagram of an exemplary enhanced asymmetrical RAID implementation in accordance with one aspect of the invention.

FIG. 3 represents an exemplary implementation of one embodiment of the present invention. A computing device 300, comprising a memory 310, processor 320 and I/O controller 330 is coupled to a number of external or internal disk drives, 340, 341, 342, drives 340, 341 and 342 typically having similar storage capacity, although the present invention contemplates the use of drives 340, 341 and 342 having dissimilar capacity. A system bus 360 may couple various system components including the memory 310 to the processor 320 and the I/O controller 330. The system bus 360 may be any of several types of bus structures including a memory bus or memory controller, a peripheral bus, and a local bus using any of a variety of bus architectures.

It should be noted that although in the exemplary implementation illustrated, three disk drives are shown, any suitable quantity and capacity of disk drives are within the spirit and scope of the contemplated invention. Computing device 300 is similarly coupled to a disk drive 350. Disk drive 350 must be of a capacity at least equal to the sum of the capacities of drives 340, 341 and 342 and is used to mirror data written to drives 340, 341 and 342.

Disk drives 340, 341, 342 and 350 may be magnetic, optical, magneto optical, any other kind of suitable drive or any combination thereof. Drives 340, 341, 342 and 350 may be connected to each other or to the processor by a SCSI, IDE or any other suitable interface.

In one embodiment of the invention, when data is written to drive 340, 341 or 342, controller 330 writes a direct image of the data approximately simultaneously to disk drive 350, hence only two I/O operations are required. In another embodiment of the invention, computer-executable instructions stored in memory 310 direct the writing of a direct image of the data approximately simultaneously to disk drive 350. Drives 340, 341, 342 and 350 do not have to be initialized in order to maintain data coherency.

If drive 340 fails, data can be read from drive 350 both to restore the drive and to allow applications dependent thereon to continue processing. If drive 341 fails, data can be read from drive 350 and if drive 342 fails, data can be read from drive 350. Little degradation of performance is likely to result because no parity calculations have to be made in order to recover the data. Moreover, any combination, or all of drives 340, 341 and 342 can fail and all data is still recoverable and immediately accessible. A failed drive, e.g. drive 340, can be rebuilt by making a copy of the portions of drive 350 on which the datasets of drive 340 reside, thus minimizing rebuild time (and time spent in "fault condition") in comparison to parity-based RAID implementations in which lost data must be recomputed.

Figure 4:
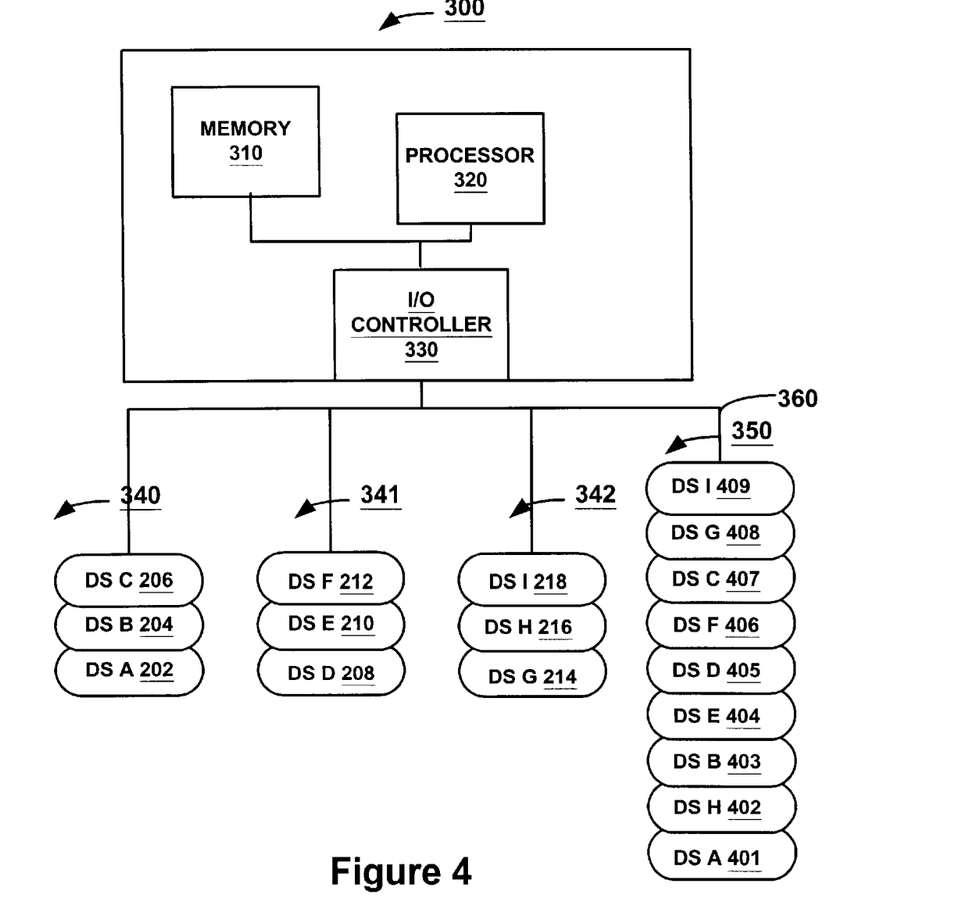
FIG. 4 is a block diagram of an exemplary enhanced asymmetrical RAID implementation in accordance with another aspect of the invention.

FIG. 4 represents an implementation of another embodiment of the present invention in which data is striped over the mirroring drive 350. Referring now to FIG. 4, for example, as a database ABC (composed of datasets A, B and C) is written to disk storage, the write operation may stripe datasets A, B, and C, onto respective platters 202, 204 and 206 of drive 340 and approximately simultaneously onto respective platters 401, 403 and 407 of mirror drive 350.

Similarly, as database DEF (composed of datasets D, E and F) is written to disk storage, the write operation may stripe datasets D, E and F onto respective platters 208, 210 and 212 of drive 341 and approximately simultaneously onto respective platters 405, 404, and 406 of mirror drive 350.

As database GHI (composed of datasets G, H and I) is written to disk storage, the write operation may stripe datasets G, H and I onto respective platters 214, 216 and 218 of drive 342 and approximately simultaneously onto respective platters 408, 402, and 409 of mirror drive 350.

Figure 5:
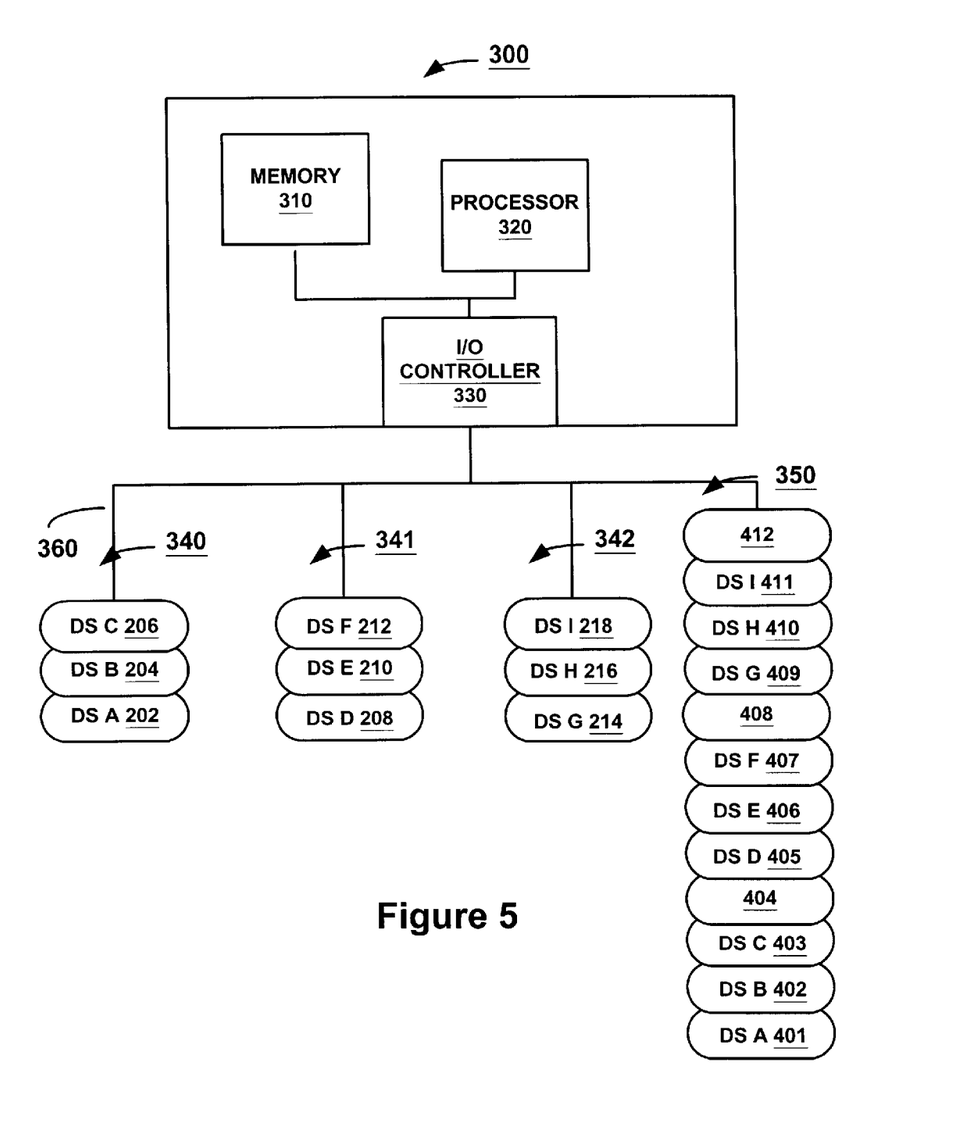
FIG. 5 is a block diagram of an exemplary enhanced asymmetrical RAID implementation in accordance with another aspect of the invention.

FIG. 5 represents an implementation of another embodiment of the present invention in which data is striped in bands or zones on the mirroring drive. Referring to FIG. 5, it is shown that as datasets A, B and C are written onto respective platters 202, 204 and 206 of drive 340, datasets A, B and C are approximately simultaneously written onto respective platters 401, 402 and 403 of mirroring drive 350, where platters 401, 402 and 403 represent a zone or area of disk 350. Similarly, when datasets D, E and F are written to respective platters 208, 210 and 212 of drive 341, datasets D, E and F are approximately simultaneously written onto respective platters 405, 406 and 407 of mirroring drive 350, where platters 405, 406 and 407 represent another zone or area of mirroring drive 350, and so on.

It should be understood that the particular arrangements of platters illustrated in the above examples is merely exemplary. The present invention is by no means limited to the arrangement of platters illustrated in FIGS. 3, 4 and 5.

Although the exemplary system illustrated in FIGS. 3, 4 and 5 comprises three smaller (data drives) and one larger (mirroring) drive, any number of smaller data drives may be employed without departing from the spirit and scope of the invention. Likewise, any suitable number of mirroring drives may be employed in the system contemplated by the invention. Generally, the present invention may comprise d smaller data drives of capacity n, where the smaller drives are typically, although not necessarily, drives of similar capacity, and m larger mirroring drives of capacity $(d/m)*n$ (or greater). For example, the present invention may include four smaller data drives of capacity n and two larger mirroring drives, each of capacity 2n. Similarly the present invention may include five smaller data drives of capacity n and three larger mirroring drives, each of capacity 2n. Similarly the invention may include three smaller data drives of capacity n and two mirroring drives of capacity 1.5n. Any combination of data and mirroring drives is contemplated, limited only by the requirement that the mirroring drive or drives have at least the capacity of the sum of the data drives and the further requirement that the capacity of a single data drive is not identical to the capacity of a single mirroring drive.

Furthermore although the exemplary illustration shows the larger drive as the mirroring drive and the smaller drives as the data drives, in accordance with another embodiment of the invention, the larger drive or drives may comprise the data drives while the smaller drives comprise the mirroring drives.

If third party or active drive capabilities exist, data can be restored without consuming host processor resources and bandwidth. Overhead is reduced from 100% for normal mirroring systems to some fraction of the total number of data drives, if the mirroring drive(s) is(are) the larger-size drive(s). Alternatively, making the larger drive(s) the data drive(s) and the smaller drives the mirroring drives facilitates the breaking off of a portion of the database to give to a user, that is, if a portion of a database is composed of datasets A, B and C and datasets A, B and C are mirrored on drive 350, a copy of drive 350 can be made and given to a third party, thereby giving the third party a portion of the database.

The present invention supports multiple simultaneous read/write operations. Typically, although a drive comprises a plurality of platters, in which each is associated with a single read/write head, so that there are a plurality of read/write heads associated with each drive, only one of the plurality of read/write heads performs a read/write operation at any given moment. Drives comprising multiple read-write heads where more than one read/write operation is performed at the same time are contemplated by the present invention.

Figure 6:
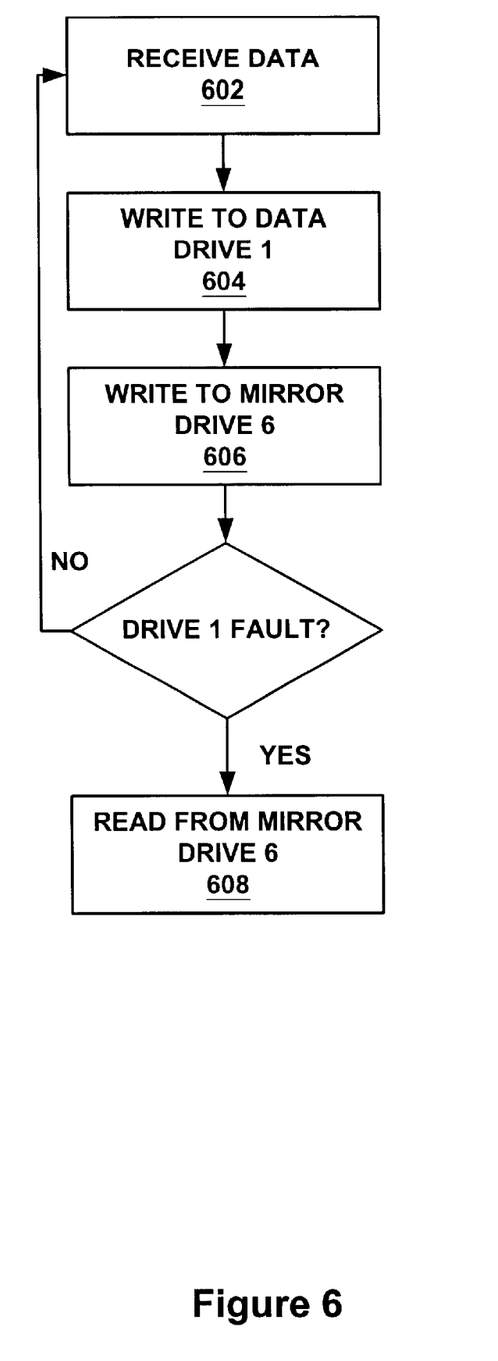
FIG. 6 is a flow diagram of an exemplary process for storing and retrieving data in accordance with the invention.

FIG. 6 represents a flow chart describing an exemplary method for implementation of the present invention. At step 602 data is received to be written to a data disk 1 of capacity x. At step 604 data is approximately simultaneously written to a mirroring drive 6 of capacity y, where x y. At step 606 if a failure of disk drive 1 occurs, a direct image of the data stored on drive 1 is read from drive 6.

Illustrative Computing Environment

Figure 1A:
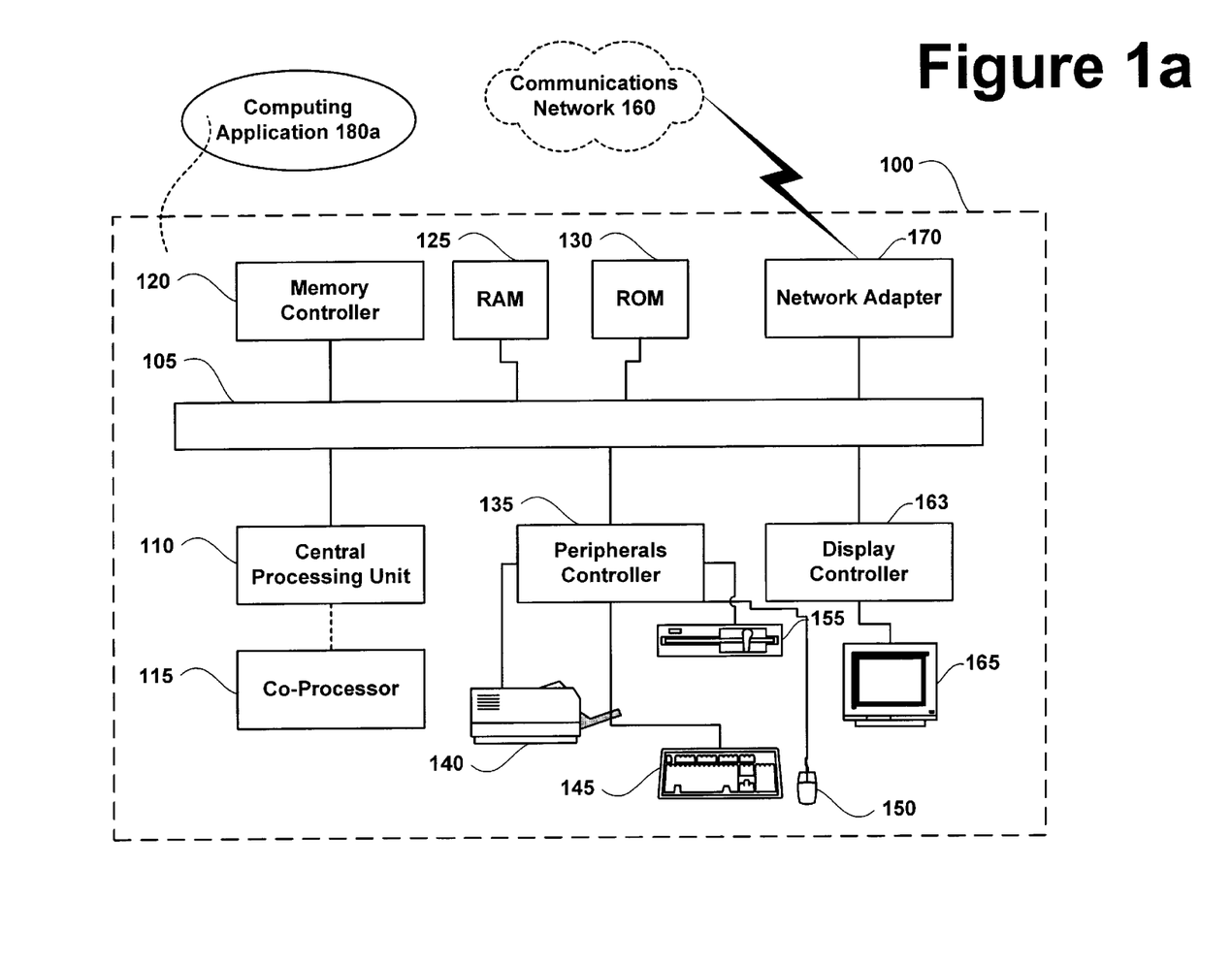
FIG. 1a is a block diagram of an exemplary computing environment in which aspects of the invention may be implemented.

FIG. 1a depicts an exemplary computing system 100 in accordance with the invention. Computing system 100 is capable of executing an exemplary application 180a in accordance with the present invention. Exemplary computing system 100 is controlled primarily by computer readable instructions, which may be in the form of software, wherever, or by whatever means such software is stored or accessed. Such software may be executed within central processing unit (CPU) 110 to cause data processing system 100 to do work. In many known workstations and personal computers central processing unit 110 is implemented by a single-chip CPU called a microprocessor. Coprocessor 115 is an optional processor, distinct from main CPU 110, that performs additional functions or assists CPU 110. One common type of coprocessor is the floating-point coprocessor, also called a numeric or math coprocessor, which is designed to perform numeric calculations faster and better than general-purpose CPU 110. Recently, however, the functions of many coprocessors have been incorporated into more powerful single-chip microprocessors.

In operation, CPU 110 fetches, decodes, and executes instructions, and transfers information to and from other resources via the computer's main data-transfer path, system bus 105. Such a system bus connects the components in computing system 100 and defines the medium for data exchange. System bus 105 typically includes data lines for sending data, address lines for sending addresses, and control lines for sending interrupts and for operating the system bus. An example of such a system bus is the PCI (Peripheral Component Interconnect) bus. Some of today's advanced busses provide a function called bus arbitration that regulates access to the bus by extension cards, controllers, and CPU 110. Devices that attach to these busses and arbitrate to take over the bus are called bus masters. Bus master support also allows multiprocessor configurations of the busses to be created by the addition of bus master adapters containing a processor and its support chips.

Memory devices coupled to system bus 105 include random access memory (RAM) 125 and read only memory (ROM) 130. Such memories include circuitry that allows information to be stored and retrieved. ROMs 130 generally contain stored data that cannot be modified. Data stored in RAM 125 can be read or changed by CPU 110 or other hardware devices. Access to RAM 125 and/or ROM 130 may be controlled by memory controller 120. Memory controller 120 may provide an address translation function that translates virtual addresses into physical addresses as instructions are executed. Memory controller 120 may also provide a memory protection function that isolates processes within the system and isolates system processes from user processes. Thus, a program running in user mode can access only memory mapped by its own process virtual address space; it cannot access memory within another process's virtual address space unless memory sharing between the processes has been set up.

In addition, computing system 100 may contain peripherals controller 135 responsible for communicating instructions from CPU 110 to peripherals, such as, printer 140, keyboard 145, mouse 150, and disk drive 155.

Display 165, which is controlled by display controller 160, is used to display visual output generated by computing system 100. Such visual output may include text, graphics, animated graphics, and video. Display 165 may be implemented with a CRT-based video display, an LCD-based flat-panel display, gas plasma-based flat-panel display, or a touch-panel. Display controller 163 includes electronic components required to generate a video signal that is sent to display 165.

Further, computing system 100 may contain network adaptor 90 which may be used to connect computing system 100 to an external communication network 160. Communications network 160 may provide computer users with means of communicating and transferring software and information electronically. Additionally, communications network 160 may provide distributed processing, which involves several computers and the sharing of workloads or cooperative efforts in performing a task. It will be appreciated that the network connections shown are exemplary and other means of establishing a communications link between the computers may be used.

Illustrative Computer Network Environment

Figure 1B:
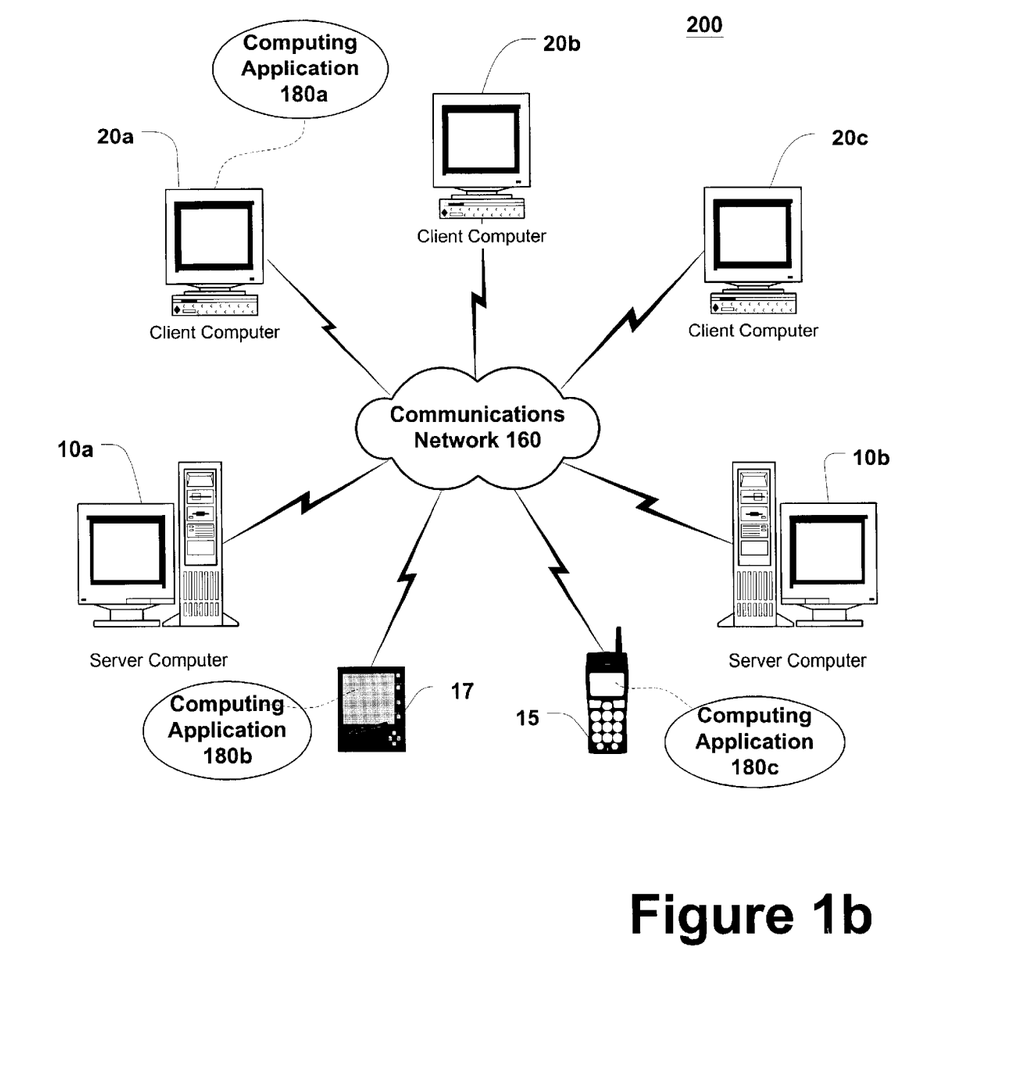
FIG. 1b is a block diagram of an exemplary network computing environment in which aspects of the invention may be implemented.

As noted above, the computer described with respect to FIG. 1a can be deployed as part of a computer network. In general, the above description applies to both server computers and client computers deployed in a network environment. FIG. 1b illustrates an exemplary network environment, with a server computer 10a, 10b in communication with client computers 20a, 20b, 20c via a communications network 160, in which the present invention may be employed. As shown in FIG. 1b, a number of servers 10a, 100b, etc., are interconnected via a communications network 160 (which may be a LAN, WAN, intranet or the Internet) with a number of client computers 20a, 20b, 20c, or computing devices, such as, mobile phone 15 and personal digital assistant 17. In a network environment in which the communications network 160 is the Internet, for example, the servers 10 can be Web servers with which the clients 20 communicate via any of a number of known protocols, such as, hypertext transfer protocol (HTTP) or wireless application protocol (WAP), as well as other innovative communication protocols. Each client computer 20 can be equipped with computing application 180a to gain access to the servers 10. Similarly, personal digital assistant 17 can be equipped with computing application 180b and mobile phone 15 can be equipped with computing application 180c to display and receive various data.

Thus, the present invention can be utilized in a computer network environment having client computing devices for accessing and interacting with the network and a server computer for interacting with client computers. However, the systems and methods for providing adaptable rendering of data of the present invention can be implemented with a variety of network-based architectures, and thus should not be limited to the example shown.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. In a computer system, a method for storing data on a plurality of disk drives, said method comprising:
   (1) providing a plurality of disk drives for storing said data,
   (2) providing a single second disk drive having a storage capacity at least equal to the total storage capacity of said first disk drives, said second disk drive providing for mirroring of data stored on said first disk drives,
   (3) simultaneously writing each of a plurality of data sets on a respective one of said first disk drives and also writing a direct image of each data set in a respective area of said second disk drive such that data coherency is maintained between data sets written on said first disk drives and their respective direct images written on said second disk drive without requiring said first or second drives to be initialized;
   (4) reading a data set by accessing the first disk drive on which the data set is stored and outputting the data set to said computer system; and
   (5) if the data set is unavailable from said first disk drive then accessing its corresponding direct image from its respective area on said second disk drive for outputting to said computer system.

2. The method of claim 1, including using the direct image read from said second disk drive when its respective data set is unavailable from its respective first disk drive to restore the unavailable data set thereon.

3. The method of claim 1, wherein each first disk drive comprises a plurality of platters, each data set being written on a respective one of said platters.

4. The method of claim 3, wherein said second disk drive also comprises a plurality of platters.

5. The method of claim 4, wherein data images corresponding to data sets on said first disk drives are striped over said second disk drive, each platter of said second disk drive representing a respective stripe.

6. The method of claim 4, wherein data images corresponding to data sets on said first disk drives are written in respective zones of said second disk drive, each zone representing a plurality of platters.

7. The method of claim 1, wherein said communication system includes a communications network, and wherein said method includes writing data sets derived from said communication network to said disk drives, and applying data sets derived from said disk drives to said communication network.

8. In a computer system, a method for storing data on a plurality of disk drives, said method comprising:
   (1) providing a single disk drive for storing said data,
   (2) providing a plurality of second disk drives having a storage capacity at least equal to the total storage capacity of said first drives, said second disk drives providing for mirroring of data stored on said first disk drive,
   (3) simultaneously writing each of a plurality of data sets on said first disk drive and also writing a direct image of each data set in a respective one of said second disk drives such that data coherency is maintained between data sets written on said first disk drive and the respective direct images written on the second disk drives without requiring said first or second drives to be initialized;

(4) reading a data set by accessing the first disk drive and outputting the data set to said computer system; and (5) if the data set is unavailable from said first disk drive then accessing its corresponding direct image from its respective second disk drive for outputting to said computer system.

9. The method of claim 8, including using the direct image read from the respective second disk drive when its respective data set is unavailable from said first drive to restore the unavailable data set thereon.

10. The method of claim 8, wherein said first disk drive comprises a plurality of platters, each data set being written on a respective one of said platters.

11. The method of claim 10, wherein each disk drive of said second disk drives also comprises a plurality of platters.

12. The method of claim 11, wherein data images corresponding to data sets are striped over said first disk drive, each platter representing a respective stripe.

13. The method of claim 11, wherein data images corresponding to data sets on said first disks are written in respective zones of said second drive, each zone representing a plurality of platters.

14. The method of claim 8, wherein said communication system includes a communications network, and wherein said method includes writing data sets derived from said communication network to said disk drives, and applying data sets derived from said disk drives to said communication network.

* * * * *